United States Patent
Yu et al.

(10) Patent No.: US 10,665,852 B2
(45) Date of Patent: May 26, 2020

(54) METHOD FOR REDUCING RESIDUAL WATER CONTENT IN BATTERY MATERIAL

(71) Applicant: GM GLOBAL TECHNOLOGY OPERATIONS LLC, Detroit, MI (US)

(72) Inventors: Zhiqiang Yu, Shanghai (CN); Dewen Kong, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 15/740,258

(22) PCT Filed: Jun. 30, 2015

(86) PCT No.: PCT/CN2015/082753
§ 371 (c)(1),
(2) Date: Dec. 27, 2017

(87) PCT Pub. No.: WO2017/000157
PCT Pub. Date: Jan. 5, 2017

(65) Prior Publication Data
US 2018/0198115 A1 Jul. 12, 2018

(51) Int. Cl.
*H01M 4/04* (2006.01)
*H01M 10/052* (2010.01)
(Continued)

(52) U.S. Cl.
CPC .......... *H01M 4/0471* (2013.01); *H01M 4/04* (2013.01); *H01M 4/366* (2013.01); *H01M 4/625* (2013.01); *H01M 10/052* (2013.01)

(58) Field of Classification Search
None
See application file for complete search history.

(56) References Cited

U.S. PATENT DOCUMENTS

| 5,287,632 A | 2/1994 | Heit et al. |
| 6,143,042 A | 11/2000 | Rogers |

(Continued)

FOREIGN PATENT DOCUMENTS

| CN | 1905102 A | 1/2007 |
| CN | 101428851 A | 5/2009 |

(Continued)

OTHER PUBLICATIONS

International Search Report and Written Opinion of the International Searching Authority issued in PCT/CN2015/082753, ISA/CN, Haidian District, Beijing, dated Jan. 18, 2016.

(Continued)

*Primary Examiner* — Karie O'Neill Apicella
(74) *Attorney, Agent, or Firm* — Harness, Dickey & Pierce, P.L.C.

(57) ABSTRACT

A method for reducing residual water content in a battery material includes placing the battery material having residual water adsorbed therein in a channel substantially sealed from an ambient environment. A gaseous mixture is caused to flow through the battery material in the channel. The gaseous mixture includes an organic solvent vapor present in an amount effective to hydrogen bond with at least some water molecules from the battery material. The gaseous mixture is caused to flow through the battery material for a predetermined amount of time, at a predetermined temperature, and at a predetermined pressure. The organic solvent vapor having at least some water molecules bonded thereto is removed from the battery material. The removing takes place for a predetermined amount of time, at a predetermined temperature, and at a predetermined pressure, thereby forming the battery material having reduced residual water content.

17 Claims, 3 Drawing Sheets

(51) Int. Cl.
H01M 4/36 (2006.01)
H01M 4/62 (2006.01)

(56) References Cited

U.S. PATENT DOCUMENTS

| | | |
|---|---|---|
| 6,306,754 B1 | 10/2001 | Agarwal |
| 7,867,550 B2 * | 1/2011 | Suzuki .................. H01G 11/86 29/623.5 |
| 2011/0289790 A1 | 12/2011 | Kazama et al. |
| 2014/0059846 A1 | 3/2014 | Schaefer |
| 2017/0162917 A1 | 6/2017 | Yu et al. |
| 2018/0198115 A1 | 7/2018 | Yu et al. |
| 2018/0287156 A1 | 10/2018 | Yu et al. |
| 2019/0165410 A1 | 5/2019 | Yu et al. |

FOREIGN PATENT DOCUMENTS

| | | |
|---|---|---|
| CN | 102113151 A | 6/2011 |
| CN | 102809264 A | 12/2012 |
| CN | 103403923 A | 11/2013 |
| CN | 104916836 A | 9/2015 |
| WO | 2017059560 A1 | 4/2017 |
| WO | 2018023527 A1 | 2/2018 |

OTHER PUBLICATIONS

International Search Report and Written Opinion issued in PCT/CN2016/080954, dated Jan. 24, 2017; ISA/CN, 8 pages.

* cited by examiner

METHOD FOR REDUCING RESIDUAL WATER CONTENT IN BATTERY MATERIAL

CROSS REFERENCE TO RELATED APPLICATIONS

This application is a U.S. National Phase Application under 35 U.S.C. 371 of International Application No. PCT/CN2015/082753 filed on Jun. 30, 2015 and published in English as WO 2017/000157 A1 on Jan. 5, 2017. The entire disclosure of the above application is incorporated herein by reference.

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a method for reducing residual water content in a battery material includes placing the battery material having residual water adsorbed therein in a channel substantially sealed from an ambient environment. A gaseous mixture is caused to flow through the battery material in the channel. The gaseous mixture includes an organic solvent vapor present in an amount effective to hydrogen bond with at least some water molecules from the battery material. The gaseous mixture is caused to flow through the battery material for a predetermined amount of time, at a predetermined temperature, and at a predetermined pressure. The organic solvent vapor having at least some water molecules bonded thereto is removed from the battery material. The removing takes place for a predetermined amount of time, at a predetermined temperature, and at a predetermined pressure, thereby forming the battery material having reduced residual water content.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium salts including $LiPF_6$, $LiBF_4$, and $LiCl_4$ are generally used as the solute of an electrolyte for a lithium battery. These salts act as the source of lithium ion supply in the battery. Fluoride lithium salts such as $LiPF_6$ may be chosen for use in the electrolyte because they are suitable for obtaining a battery of high voltage and high capacity. However, the electrolyte based on such fluoride solutes is very sensitive to moisture. This reaction is described below.

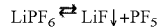

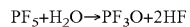

The resulting HF can corrode the cathode and the current collectors, decrease the capacity of the battery, and/or reduce the life cycle of the battery.

As such, the manufacturing process for making batteries and/or battery materials typically uses a desiccant dehumidifier. Normal levels of relative humidity ("RH") may cause quality control problems in the lithium battery manufacturing process. Even ambient moisture present in the manufacturing room may degrade the "memory" characteristic (i.e., ability to hold charge) of the lithium. As such, the processing takes place in dry rooms, where the environment is made up of air with the dew point temperature being generally controlled at a very low relative humidity level (e.g., ranging from about 0.1% to about 5%, with one example being 0.5%).

Dry rooms, or environmental chambers, are generally built to house the manufacturing areas for batteries. Due to the reactive nature of the moisture in the air during lithium battery manufacturing, most lithium battery processes typically require a dry room dew point of from about −40° F. (−40° C.) to about −50° F. (−45° C.) or lower, (i.e., from about 0.6 to about 0.3 grains of moisture per pound (gr/#), respectively). The supply air moisture level may be required to be from about −60° F. (−51° C.) to about −100° F. (−73° C.) dew point (0.1 to 0.0 gr/#, respectively) when accounting for potential moisture migration into the dry room (even with an airlock entry way), and a potential slight latent gain within the room due to the workers. Therefore, maintaining the dry room in order to keep the low humidity level can require a tremendous amount of energy and resources.

In the examples of the method disclosed herein, the use of a dry room can be reduced to a single step during manufacturing of a battery and/or battery material. The elimination of a dry room during most of the manufacturing method can significantly reduce the cost of producing a battery. Furthermore, the overall residual water content in the battery material can be reduced to a smaller amount using less time and a lower temperature compared to some conventional methods of reducing the residual water content in the battery material. As a result, the reduction of the residual water content in the battery material may increase the life cycle, decrease corrosion, and reduce capacity loss of the battery.

Figure 1A:
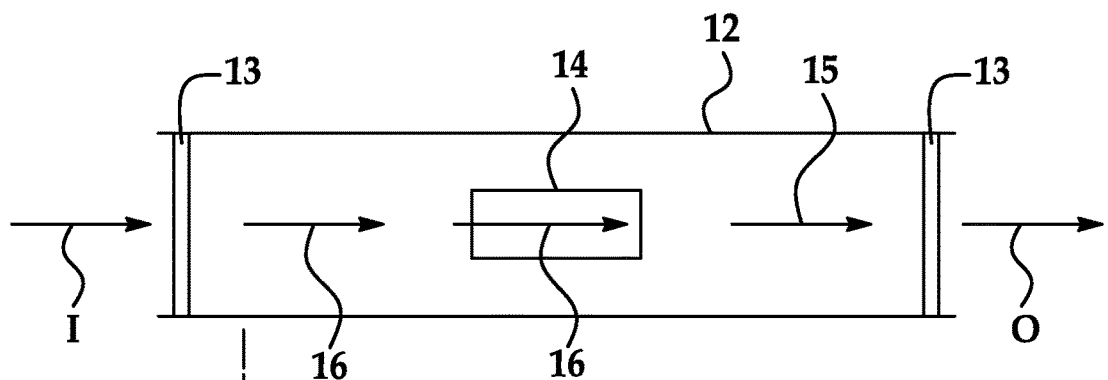
FIGS. 1A-1C are schematic, cross-sectional views of examples of the method for reducing residual water content in a battery material.
Figure 1B:
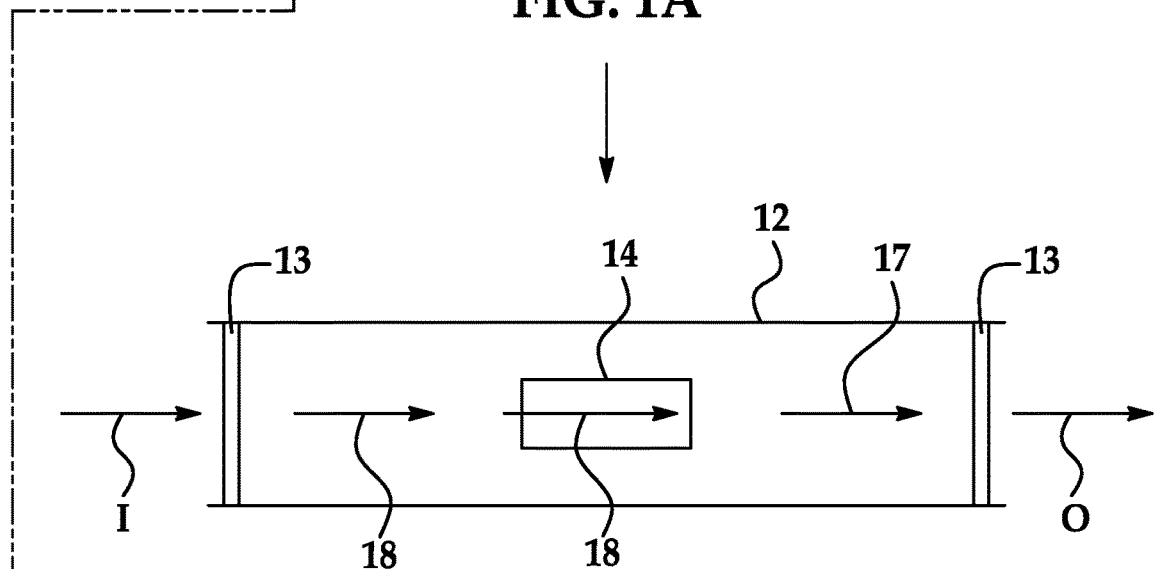
Figure 1C:
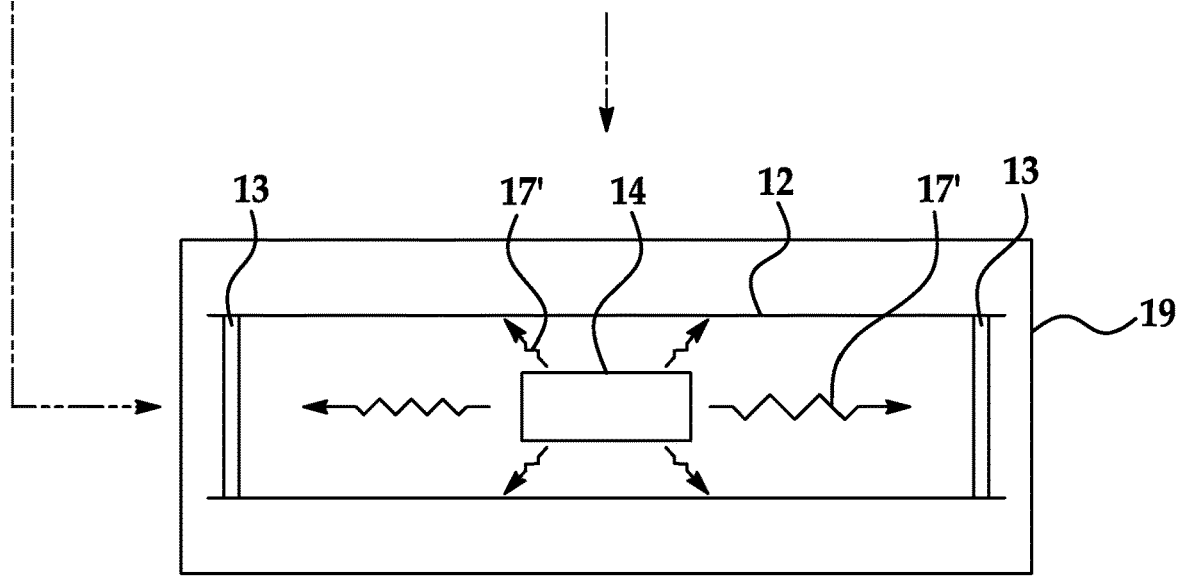

Referring now to FIGS. 1A-1C, an example of a method for reducing residual water content in a battery material according to the present disclosure includes placing a battery material 14 having residual water adsorbed therein in a channel 12 substantially sealed (via a suitable seal 13) from an ambient environment.

In an example, the battery material 14 may be battery material powder (which in addition to the raw active material, may include polymer binders, conductive fillers, etc.). In another example, the battery material 14 may be an electrode, such as a positive electrode or a negative electrode. In an example, the electrode is a dry electrode coating including active material, polymer binder, and conductive filler. In yet another example, the battery material 14 may be a cell core (anode, separator, and cathode). In an example, the cell core is a stacked or wound structure with positive and negative electrodes and the separator. It is to be understood that the battery material 14 may be battery material powder, an electrode, and/or a cell core to be used in a lithium ion battery, a lithium sulfur battery, a lithium air battery, a sodium sulfur battery, or a capacitor.

In the lithium air battery, the raw active material for the negative electrode is lithium metal and the raw active material for the positive electrode is mesoporous carbon including metal catalysts (e.g., manganese, cobalt, ruthenium, platinum, silver, or a mixture of cobalt and manganese).

In the lithium ion battery or the lithium sulfur battery, suitable raw active materials for the negative electrode include lithium, lithium titanate, silicon, and graphite. In the sodium sulfur battery, a suitable raw active material for the negative electrode is sodium.

In the lithium ion battery, suitable raw active materials for the positive electrode include spinel lithium manganese oxide ($LiMn_2O_4$); lithium cobalt oxide ($LiCoO_2$); a nickel-manganese oxide spinel [$Li(Ni_{0.5}Mn_{1.5})O_4$]; a lithium iron polyanion oxide, such as lithium iron phosphate ($LiFePO_4$) or lithium iron fluorophosphate ($Li_2FePO_4F$); a layered nickel-manganese-cobalt oxide (LiNMC or NMC) [$Li(Ni_xMn_yCo_z)O_2$ or $Li(Ni_xMn_yCo_z)O_4$, where each of x, y, and z may be 1/3 (i.e., LiNMC 1,1,1), or the Ni content may be more, where x=0.6 and each of y and z=0.2 (i.e., LiNMC 6,2,2), or where x=0.8 and each of y and z=0.1, or where x=0.5, y=0.3, and z=0.2 (i.e., LiNMC 5,3,2), or the Mn content may be more than Ni and Co]; $xLi_2MnO_3 \cdot (1-x)LiMO_2$ (M is composed of any ratio of Ni, Mn and/or Co); $LiNi_xM_{1-x}O_2$ (M is composed of any ratio of Al, Co, and/or Mg); aluminum stabilized lithium manganese oxide spinel ($Li_xMn_{2-x}Al_yO_4$); lithium vanadium oxide ($LiV_2O_5$); $Li_2MSiO_4$ (M is composed of any ratio of Co, Fe, and/or Mn), and any other high efficiency nickel-manganese-cobalt material. By "any ratio" it is meant that any element may be present in any amount. So, for example, M could be Al, with or without Co and/or Mg, or any other combination of the listed elements. In the lithium sulfur battery or the sodium sulfur battery, raw active materials for the positive electrode include a sulfur-carbon composite having a ratio of sulfur:carbon ranging from 1:9 to 9:1.

In the capacitor, suitable raw active materials include metal oxides (e.g., $PbO_2$), metal sulfides (e.g., $TiS_2$), carbon (e.g., activated carbon, graphite), and polymers (e.g., polyaniline).

In any of the example electrodes, suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, styrene-butadiene rubber carboxymethyl cellulose (SBR-CMC), polyethylene oxide (PEO), poly(acrylamide-co-diallyl dimethyl ammonium chloride), cross-linked polyacrylic acid-polyethylenimine, other water-soluble or organic solvent based binders, or any other suitable binder material. Also in any of the example electrodes, the conductive filler may be a high surface area carbon, such as acetylene black or activated carbon.

It is to be understood that the channel 12 may be of any shape, size, and/or configuration as long as it is suitable to house the battery material 14. In an example, the channel may have any of a rectangular cross-section, a circular cross-section, a square cross-section, or an irregularly shaped cross-section. In an example, the channel 12 has a length of about 400 mm, a width of about 200 mm, and a thickness of about 10 mm. This is one example, and it is to be understood that the channel 12 may have other suitable dimensions. The channel 12 may be formed of glass, quartz, stainless steel, or a ceramic material.

In an example, the channel 12 is substantially sealed from an ambient environment. As used herein, an "ambient environment" is defined as an environment immediately surrounding the channel 12 (i.e., the environment outside the walls that define the channel 12). Additionally, as used herein, "substantially sealed" from the ambient environment means that no air or gas (e.g., organic vapor) can enter into the channel 12 from the ambient environment or escape into the ambient environment from the channel 12, except through the gas conduits I, O entering and exiting the channel 12. Examples of suitable seal 13 materials include cyanoacrylates (i.e., super glues), polytetrafluoroethylene (e.g., TEFLON® from DuPont), etc.

As can be seen in FIG. 1A, the method further includes causing a gaseous mixture 16 to flow through the battery material 14 in the channel 12. For illustrative purposes, the inlet is shown at the left of the figure, and the outlet is shown at the right of the figure, and a substantially linear flow path is shown; but it is to be understood that any inlet/outlet orientation and any flow paths (including non-linear flow paths, tortuous flow paths, etc.) are contemplated as being within the purview of the present disclosure. The gaseous mixture 16 enters and exits channel 12 through the seals 13 via conduits (schematically represented by arrow I adjacent the inlet and arrow O adjacent the outlet).

The gaseous mixture 16 includes an organic solvent vapor and a carrier gas. In an example, the carrier gas is selected from an inert gas, a non-inert gas, or a mixture of an inert gas and a non-inert gas. The carrier gas generally has a high purity (e.g., at least 98% pure) and is relatively dry (e.g., water moisture content less than 500 ppm). As an example, $N_2$ used as the carrier gas may have a purity of 99.9% and less than 200 ppm water moisture.

Some suitable examples of inert gases include argon gas, helium gas, neon gas, krypton gas, xenon gas, radon gas, nitrogen gas, and mixtures thereof. Some suitable examples of non-inert gases include carbon dioxide gas, hydrogen gas, oxygen gas, air, methane gas, ethane gas, propane gas, and combinations thereof. In an example, the selected carrier gas is argon.

The organic solvent vapor in the gaseous mixture 16 forms hydrogen bonds with at least some water molecules from the residual water in the battery material 14. The organic solvent vapor can form a hydrogen bond with the residual water due, in part, to the hydroxyl groups or oxygen atoms in the organic solvent vapor. It is believed that the hydrogen bonds between the organic solvent vapor in the gaseous mixture 16 and the residual water interfere with the hydrogen bond structure of the residual water molecules. This interference destabilizes the molecular structure of the residual water. As a result, the residual water is easier to remove from the battery material 14.

The organic solvent vapor in the gaseous mixture 16 having at least some water molecules bonded thereto is schematically shown by arrow 15 in FIG. 1A. As such, arrow 15 represents the gaseous mixture 16 and water vapor.

Some examples of organic solvents to form the organic solvent vapor include any of alcohols, aldehydes, acids, ketones, ethers, furans, haloalkanes, and combinations thereof. Some examples of suitable organic solvents include a chlorine atom(s), a fluorine atom(s), an oxygen atom(s) or a hydrogen atom(s), and have a relatively low boiling point (i.e., <150° C. (<302° F.)), as these organic solvents can form a hydrogen bond with residual water molecules. Other examples of a suitable organic solvent has either an oxygen atom(s) or an —OH group(s) which can interfere the hydrogen bond structure of the residual water molecules.

Some examples of alcohols include methanol, ethanol, propanol, butanol, or combinations thereof. Some examples of aldehydes include formaldehyde, acetaldehyde, and combinations thereof. Some examples of acids include acetic acid, formic acid, and combinations thereof. Examples of ketones include acetone, butanone, and methyl ethyl ketone. Some examples of ethers include diethyl ether, methyl ethyl ether, and combinations thereof. Example of furans include tetrahydrofuran and dihydrofuran. Examples of haloalkanes include chloroform and dichloromethane (i.e., methylene chloride). In an example, the organic solvent is ethanol.

It is to be understood that the organic solvent vapor may be present in the gaseous mixture 16 in an amount ranging from greater than 0% to about 99.9% by volume based on a total volume of the gaseous mixture 16. In an example, the organic solvent is present in an amount ranging from about 5% to about 20% by volume. It is believed that any amount of organic solvent vapor may be used, depending, in part, on the predetermined time the gaseous mixture 16 flows through the channel 12, the predetermined temperature of the channel 12 when the gaseous mixture 16 flows through the channel 12, and the predetermined pressure inside the channel 12 when the gaseous mixture 16 flows through the channel 12. The organic solvent volume concentration may be varied, depending upon the overall efficiency of water removal.

In an example, the predetermined time that the gaseous mixture 16 flows through the channel 12 may range from about 0.5 hours to about 24 hours. In a further example, the predetermined time that the gaseous mixture 16 flows through the channel 12 ranges from about 0.5 hours to about 5 hours.

The predetermined temperature of the channel 12 when the gaseous mixture 16 flows through the channel 12 may range from about 0° C. to about 300° C. The predetermined temperature of the channel 12 refers to the temperature of the environment within the channel 12 that surrounds the battery material 14. A temperature sensor may be positioned inside the channel 12 in the proximity of the battery material 14. In an example, the temperature may range from about 120° C. to about 300° C., e.g., when the battery material 14 is a battery material powder. In another example, the temperature may range from about 60° C. to about 150° C., e.g., when the battery material 14 is an electrode. In yet another example, the temperature may range from about 30° C. to about 100° C., e.g., when the battery material 14 is a cell core.

The selection of the carrier gas and temperature depends, at least in part, on the battery material 14 and any undesirable side reactions that may take place. As an example, a negative electrode made with a carbon active material and a copper current collector should not be heated in $O_2$ or air at a temperature higher than 150° C. because copper foil and carbon can be oxidized by oxygen. As such, with a carbon active material and $O_2$ or air carrier gas, the temperature should be 120° C. or less. However, the same negative electrode made of a carbon active material can be heated in hydrogen gas at temperatures ranging from about 150° C. to about 200° C. because there are no unfavorable reactions in the reducing environment. As still another example, a positive electrode made of metal oxide should not be heated in hydrogen gas at temperatures ranging from about 100° C. to about 300° C. because metal oxides can undesirably be reduced in these conditions. Air may be used for battery material powder, electrodes, or drying cell cores (as the non-organic solvent-containing gas 18 described further herein), at specific temperatures as long as there is no undesirable reaction. When ethanol is the organic solvent and air is the carrier gas, the temperature should be less than 250° C., as ethanol vapor and air may react at temperatures ranging from about 250° C. to about 350° C. As such, the carrier gas and temperature may be selected so that undesirable reactions (e.g., involving the active material) do not take place.

The predetermined pressure of the channel 12 when the gaseous mixture 16 flows through the channel 12 may range from about 0 bar to about 10 bar. The predetermined pressure of the channel 12 refers to the pressure of the environment within the channel 12 that surrounds the battery material 14. A pressure sensor may be positioned inside the channel 12 in the proximity of the battery material 14. In an example, the pressure ranges from about 1 bar to about 2 bar. The example pressures given herein may be used with any of the battery materials 14 (i.e., battery material powder, electrode, cell core).

The method for reducing residual water content in a battery material 14 further includes removing the organic solvent vapor having at least some water molecules bonded thereto from the battery material 14. FIG. 1B shows one example of removing; and FIG. 1C shows another example of removing. It is to be understood that the process shown in FIG. 1B alone may be used, or the process in FIG. 1C alone may be used, or both the processes in FIGS. 1B and 1C may be utilized in sequence (1B and then 1C). The combination of the processes in FIGS. 1B and 1C may be used to completely or substantially completely dry the organic solvent vapor out of the battery material 14.

Referring now to FIG. 1B, in one example, the organic solvent vapor having at least some water molecules bonded thereto may be removed from the battery material 14 by passing a non-organic solvent-containing/drying gas 18 through the channel 12. It is to be understood that the non-organic solvent-containing gas 18 may be selected from the inert gases, non-inert gases, or a mixture of inert gas and non-inert gas as previously disclosed herein for the carrier gas of the gaseous mixture 16. It is to be understood that the selected non-organic solvent-containing/drying gas 18 may be the same as, or different from the selected carrier gas of the gaseous mixture 16. Any carrier gas and any non-organic solvent-containing/drying gas 18 may be used in the respective steps, as long as each of the gases has a high purity and is dry. In an example, the selected non-organic solvent-containing/drying gas 18 is argon.

In this example, the predetermined time the non-organic solvent containing gas 18 flows through the channel 12 may range from about 0.5 hours to about 24 hours. In an example, the predetermined time ranges from about 0.5 hours to about 5 hours.

The predetermined temperature of the channel 12 (i.e., the temperature of the environment within the channel 12 that surrounds the battery material 14) when the non-organic solvent containing gas 18 flows through the channel 12 may range from about 0° C. to about 300° C. In an example, the temperature may range from about 120° C. to about 300° C., e.g., when the battery material 14 is a battery material powder. In another example, the temperature may range from about 60° C. to about 150° C., e.g., when the battery material 14 is an electrode. In yet another example, the temperature may range from about 30° C. to about 100° C., e.g., when the battery material 14 is a cell core.

The predetermined pressure of the channel 12 (i.e., the pressure of the environment within the channel 12 that surrounds the battery material 14) when the non-organic solvent containing gas 18 flows through the channel 12 may range from about 0 bar to about 10 bar. In an example, the pressure ranges from about 1 bar to about 2 bar.

The non-organic solvent-containing/drying gas 18 and the removed organic solvent vapor are schematically shown by arrow 17 in FIG. 1B. It is to be understood that trace amounts of water may still be present at arrow 17.

Referring now to FIG. 1C, in another example, the organic solvent vapor having at least some water molecules bonded thereto may be removed by placing the channel 12 (having the battery material 14 therein) in a vacuum drying oven 19 at a predetermined temperature and at a predetermined pressure for a predetermined amount of time. While not shown in FIG. 1C, the battery material 14 may be removed from the channel 12, and the battery material 14 alone may be placed in the vacuum drying oven 19 at a predetermined temperature and at a predetermined pressure for a predetermined amount of time. The specific predetermined time, temperature, and pressure used may vary depending, in part, on the overall efficiency and cost of the process. In terms of efficiency (i.e., organic solvent vapor removal amount in a certain time), it is desirable to have the pressure as low as possible and the temperature as high as possible to dry the organic solvent out of the battery material 14.

The predetermined time the channel 12 may be placed in the vacuum drying oven 19 may range from about 0.1 hours to about 24 hours. In an example, the predetermined time ranges from about 1 hour to about 5 hours.

The predetermined temperature of the vacuum drying oven 19 may range from about 0° C. to about 300° C. In an example, the oven 19 temperature may range from about 120° C. to about 300° C., e.g., when the battery material 14 is a battery material powder. In another example, the oven 19 temperature may range from about 60° C. to about 150° C., e.g., when the battery material 14 is an electrode. In yet another example, the oven 19 temperature may range from about 30° C. to about 100° C., e.g., when the battery material 14 is a cell core.

The predetermined pressure of the vacuum drying oven 19 may range from about 0 bar to about 1 bar. In an example, the pressure ranges from about 10 mbar to about 100 mbar.

The removed organic solvent vapor having at least some water molecules bonded thereto is schematically shown by arrow 17' in FIG. 1C.

After the organic solvent vapor has been removed, the concentration of residual water in the battery material 14 may be less than 600 ppm. The final water level may vary depending upon the battery material 14. It is desirable that the water level be as low as possible.

The battery material 14 having reduced residual water content may then be used to form a lithium ion battery, a lithium sulfur battery, a lithium air battery, or a sodium sulfur battery. It is to be understood that in some examples of the battery fabrication process disclosed herein (see FIG. 2B), no large dry room (e.g., area with RH of 0.5%, shown as 24 in FIG. 2A) is used to fabricate the battery formed from the battery material 14 with a reduced residual water content (resulting from examples of the method disclosed herein). Rather, in these examples (as shown in FIG. 2B), a drying space (e.g., a glovebox or a small dry room) with a relative humidity ranging from about 0.1% to about 5% is utilized only during an electrolyte filling process 40 of the battery fabrication.

Figure 2A:
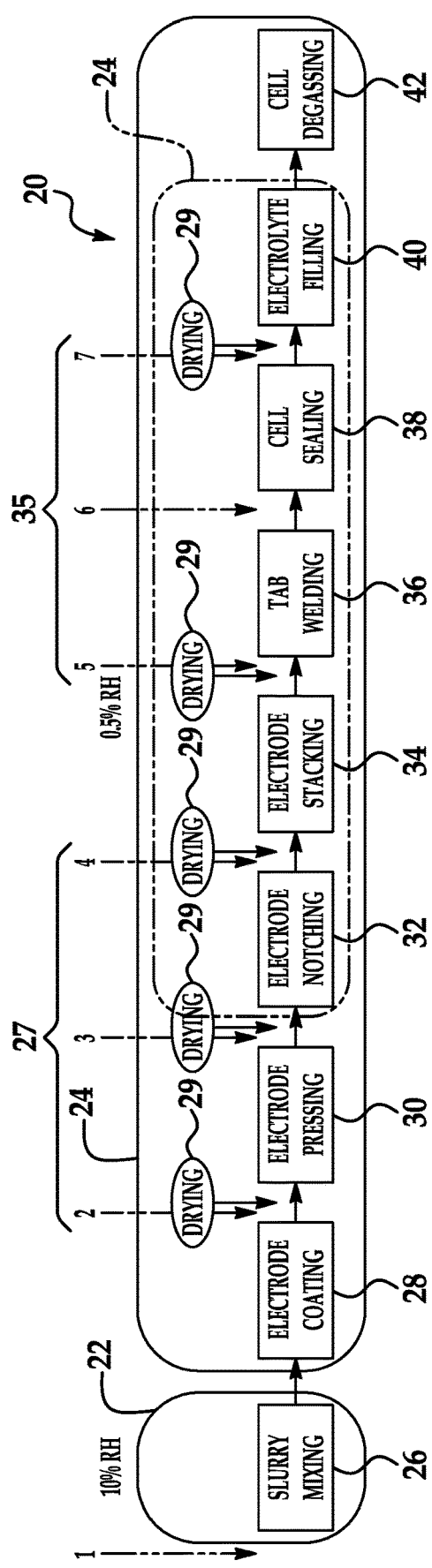
FIG. 2A is a diagram of a method for manufacturing a battery cell, not using a battery material having reduced residual water content formed from an example of the present disclosure, but illustrating seven points in the manufacturing method at which the method for reducing residual water content in the battery material may be implemented.

Referring now to FIG. 2A, there is shown a diagram of a method 20 for manufacturing a battery cell (e.g., a cylindrical battery, a prismatic battery, a pouch cell, or any other suitable battery cell configuration), not using a battery material 14 having reduced residual water content formed from an example of the present disclosure. However, FIG. 2A also illustrates seven points (labeled 1-7) in the fabrication process where the method for reducing residual water content in the battery material 14 may be implemented. The method for reducing residual water content may be performed at one of the points 1-7, or at any combination of the points 1-7 (e.g., at point 2 and point 7). At point 1 of FIG. 2A, the method for reducing residual water content may be performed to remove water from the battery material powder. Points 2 through 4 are located at the electrode fabrication steps 27. As such, at any or all of points 2-4 of FIG. 2A, the method for reducing residual water content may be performed to remove water from the electrode. Points 5 through 7 are located at the cell core fabrication steps 35. As such, at any or all of points 5-7 of FIG. 2A, the method for reducing residual water content may be performed to remove water from the cell core. When the method for reducing residual water content is performed at any of points 2, 3, 4, 5, or 7 of FIG. 2A, the drying step 29 at this particular point may not be performed.

Figure 2B:
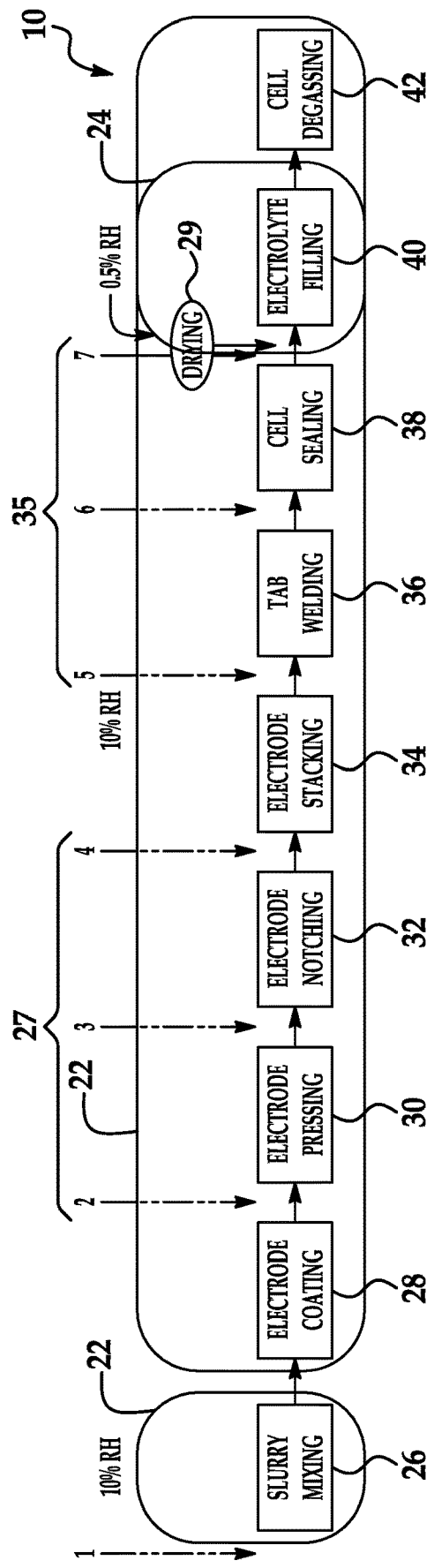
FIG. 2B is a diagram of a method for manufacturing a battery cell, using a battery material having reduced residual water content formed from an example of the present disclosure, illustrating one point in the manufacturing method at which the method for reducing residual water content in the battery material is implemented and illustrating six other points in the manufacturing method at which the method for reducing residual water content in the battery material may be implemented.

FIG. 2B is a diagram of a method 10 for manufacturing a battery cell, using a battery material 14 having reduced residual water content formed from an example of the present disclosure. It is to be understood that the method for reducing residual water content is performed at least at point 7 to ensure that the cell core is dried. FIG. 2B also illustrates the six other points (labeled 1-6) in the fabrication process where the method for reducing residual water content in the battery material 14 may be implemented.

The methods 20, 10 generally include slurry mixing 26, electrode coating 28, electrode pressing 30, electrode notching 32, electrode stacking 34, tab welding 36, cell sealing 38, electrolyte filling 40, and cell degassing 42.

Slurry mixing 26 generally includes mixing active, conductive, and binder material into a slurry under vacuum. Electrode coating 28 generally includes applying layer(s) of slurry onto a current collector and drying it with an attached heater. Electrode pressing (calendering) 30 generally includes compressing the electrode to a desired thickness/density. Electrode notching 32 generally includes using a slitting machine to slit/cut an electrode sheet to strips of a desired size. Electrode stacking 34 generally includes forming, e.g., by a winding machine, layers of anode, separator, and cathode into a cell core. Tab welding 36 generally includes attaching the cell to a cap. Cell sealing 38 generally includes, e.g., with a sealing machine/crimper, aligning the cap with the open end of the case, and sealing the case. Electrolyte filling 40 generally includes injecting the case with an electrolyte. As depicted in FIG. 2A, several drying steps 29 may take place between the other steps.

In method 20 shown in FIG. 2A, a 10% relative humidity area (shown at reference number 22) is used during the slurry mixing 26. At slurry mixing 26, the relative humidity may range from about 0.5% to about 20%. In one example, the remaining portion of the manufacturing method 20 (e.g., electrode coating 28, electrode pressing 30, electrode notching 32, electrode stacking 34, tab welding 36, cell sealing 38, electrolyte filling 40, and cell degassing 42) occurs within a low relative humidity area 24 (identified by the solid line). In another example, electrode notching 32, electrode stacking 34, tab welding 36, cell sealing 38, and electrolyte filling 40 occurs within the low relative humidity area 24 (identified by the phantom line). In either example, the relative humidity of the area 24 may range from about 0.1% to about 5%, with 0.5% being one example. The relative humidity of the area 24 may range from about 0.1% to about 5%, with 0.5% being one example. In order to maintain the low relative humidity throughout the area 24, a large dry room may be used. In addition, after each of the electrode coating 28, the electrode pressing 30, the electrode notching 32, the electrode stacking 34, and the cell sealing 38, a drying step 29 may be included to prevent an increase in the residual water content of the battery cell being produced. However, as noted above, when the method for reducing residual water content is performed at any of points 2, 3, 4, 5, or 7 of FIG. 2A, the drying step 29 at this particular point may not be performed.

In contrast, in method 10 shown in FIG. 2B, the relative humidity area 22 (ranging from about 0.5% RH to about 20% RH) may be used throughout the entire manufacturing process of the battery cell except during the electrolyte filling 40. During the electrolyte filling 40, the low relative humidity area 24 may be used. This low relative humidity area 24 may be a small dry room or a glove box. In an example, the glove box is mainly argon, and is oxygen free and $N_2$ free, and has water <0.1% RH. In addition, in the method 10, a drying step 29 may occur once, after cell sealing 38 (as opposed to the several drying steps 29 in method 20). However, with the method for reducing residual water content being performed at least at point 7 in FIG. 2B, the drying step 29 at this point may not be performed.

It is to be understood that the residual water content may be reduced using the examples of the method disclosed herein on the battery material powder before the slurry mixing 26 occurs (point 1 in FIG. 2B). In another example, the residual water content may be reduced using examples of the method disclosed herein on the electrode at any point after coating an electrode slurry onto a current collector (e.g., after electrode coating 28, electrode pressing 30, and/or electrode notching 32) (points 2 through 4 in FIG. 2B). In yet another example, the residual water content may be reduced using examples of the method disclosed herein after the cell core has been formed (e.g., after electrode stacking 34 and/or tab welding 36) (points 5 and 6 in FIG. 2B). This allows the manufacturing of electrodes to occur using a less intense environment (e.g., without a dry room) with less drying involved in the overall process.

To further illustrate the present disclosure, an example is given herein. It is to be understood that this example is provided for illustrative purposes and is not to be construed as limiting the scope of the disclosure.

EXAMPLE

Figure 3:
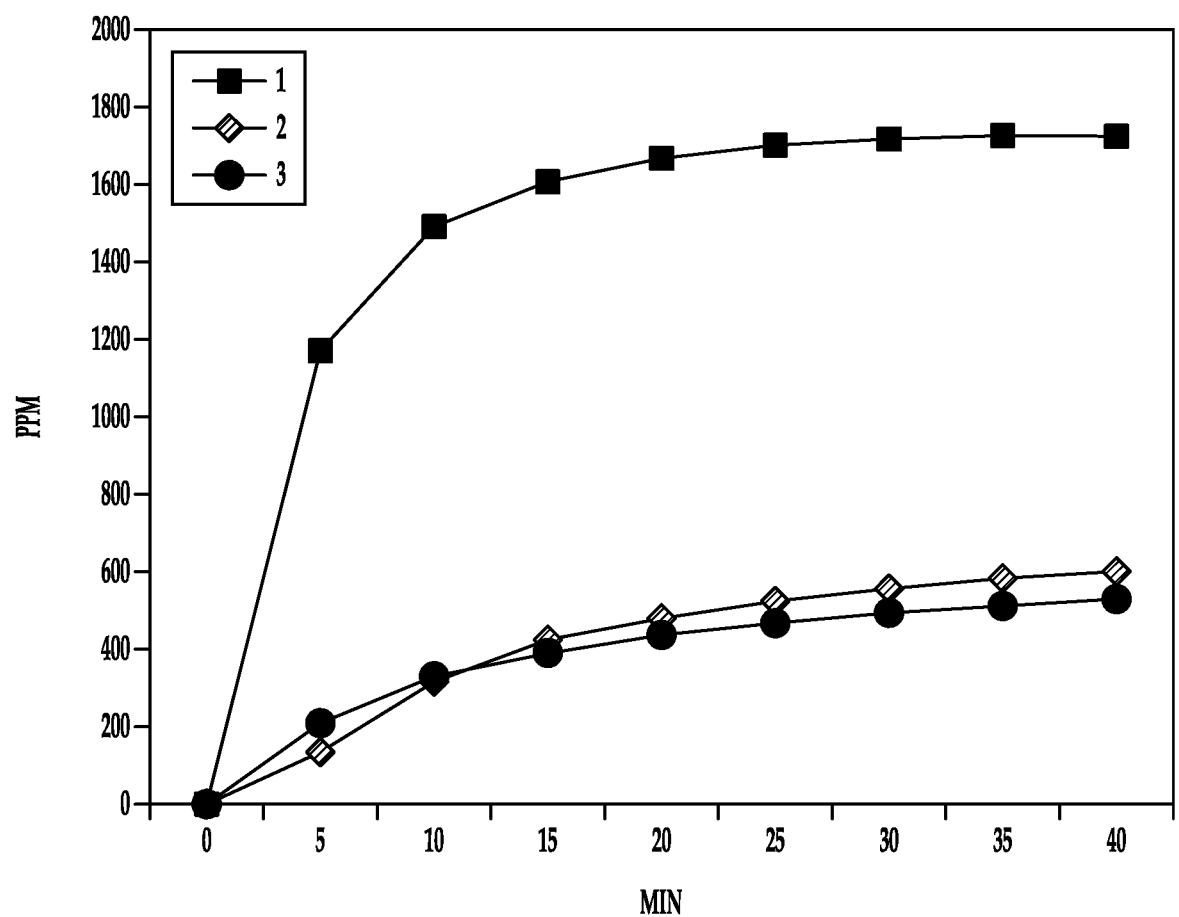
FIG. 3 is a graph exhibiting the cumulative water content (in ppm) vs. time (in minutes) in a raw battery material powder, a battery material powder treated using a comparative example method, and a battery material powder treated using an example of the method disclosed herein.

Lithium titanate powder ("LTO") was used as the battery material. FIG. 3 is a graph exhibiting the cumulative water content (in ppm) vs. time (in minutes) in a raw untreated LTO powder, an LTO powder treated using a comparative example method, and an LTO powder treated using an example of the method disclosed herein. The residual water content of the raw LTO powder, the comparative LTO powder, and the treated LTO powder using an example of the method disclosed herein was measured using the Karl-Fisher method (a standard method for measuring water contents in battery material).

The untreated raw LTO powder is labeled "1". The comparative LTO powder labeled "2" was placed in a vacuum drying oven at 120° C. for 10 hours to reduce the residual water. The example LTO powder labeled "3" was placed in a channel and treated using a gaseous mixture 16 including argon gas as the inert gas and ethanol as the organic solvent vapor. The ethanol was present at about 8% by volume based on the total volume of the gaseous mixture 16. The gaseous mixture 16 flowed through the LTO powder at 60° C. for about 1.5 hours at a pressure of 1 bar. Then, pure argon gas as the drying gas 18 flowed through the LTO powder at 60° C. for about 2.5 hours at a pressure of 1 bar to remove the organic solvent vapor having the at least some water molecules bonded thereto from the LTO battery material 14.

As illustrated in FIG. 3, not only did the LTO powder treated using an example of the method disclosed herein use a lower temperature and less time to reduce residual water content in the LTO powder, but the LTO powder also had a lower residual water content of about 529 ppm. In contrast, the raw untreated LTO powder had a much greater residual water content of about 1726 ppm. The comparative LTO powder had a higher (than example LTO powder 3) residual water content of about 602 ppm, and required a higher temperature and longer time to achieve that residual water content.

It is believed that the reduced residual water content of the treated LTO powder 3 using an example of the method disclosed herein was due, in part, to the ability of ethanol to form hydrogen bonds with water, thereby destabilizing the water structure. As a result, not only was residual water content lower compared to the comparative LTO powder 2, but the residual water was also easier to remove, as evidenced by the use of a lower temperature and less time to subject the LTO powder to the example method disclosed herein.

The gas phase process according to examples of the present disclosure can remove residual water out of a battery electrode and a cell core in a single apparatus, since the gas flow simply needs to be switched from the gaseous mixture 16 to the non-organic solvent-containing/drying gas 18. In contrast, a liquid phase process generally needs two apparatuses, where the first apparatus is to wet the samples, and the second is to dry the samples. Further, the gas phase according to examples of the present disclosure can work well for cell cores, which is only one-step away from the final sealed battery. However, a liquid phase process generally cannot work well for cell cores since it needs about 80° C.-120° C. to dry the organic solvent out, and the relatively high temperature will damage the separator in a cell core. Still further, the gas phase according to examples of the present disclosure can optimize the removal efficiency by tuning the vapor concentration in inert gas. The concentration of organic solvent vapor in carrier gas can be tuned by controlling the vapor pressure of the organic solvent at a predetermined pressure. For example, at 1 bar pressure, the ethanol concentration in the carrier gas can increase from 8% to 20% by increasing the temperature of the ethanol solvent. An ethanol/gas mixture may be generated by bubbling the carrier gas through ethanol liquid, where the temperature of ethanol liquid can be controlled to tune the concentration of ethanol in carrier gas. However, a liquid phase process uses pure solvent, and there is no method of tuning a pure solvent to improve the efficiency. As previously mentioned, in the gas phase, efficiency can be improved by increasing solvent (e.g., ethanol) concentration. However, in the liquid phase, ethanol is (and several other organic solvents are) highly miscible with water and the pure solvent is already 100% ethanol. It is impossible to tune the efficiency by changing ethanol concentration in the liquid phase.

Additionally and fundamentally, in the gas phase according to examples of the present disclosure, gas molecules can reach into tiny pores and diffuse water out; however, a liquid phase process may undesirably face the issue of low diffusion since some tiny pores may not be accessible by a liquid.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.5 hours to about 24 hours should be interpreted to include not only the explicitly recited limits of from about 0.5 hours to about 24 hours, but also to include individual values, such as 7.5 hours, 11 hours, etc., and sub-ranges, such as from about 4 hours to about 8 hours, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for reducing residual water content in a battery material, comprising:
   placing the battery material having residual water adsorbed therein in a channel substantially sealed from an ambient environment;
   flowing a gaseous mixture through the channel to treat the battery material, the gaseous mixture including an organic solvent vapor present in an amount effective to bond with at least some water molecules from the battery material, the flowing taking place for a predetermined amount of time during which the flowing gaseous mixture has a predetermined temperature[H] and at a predetermined pressure within the channel; and
   removing the organic solvent vapor having the at least some water molecules bonded thereto from the channel, the removing taking place for a predetermined amount of time during which the organic solvent vapor having the at least some water molecules bonded thereto has a predetermined temperature and at a predetermined pressure within the channel, thereby forming the battery material having reduced residual water content.

2. The method as defined in claim 1 wherein an organic solvent that forms the organic solvent vapor is selected from the group consisting of an alcohol, an aldehyde, an acid, a ketone, an ether, a furan, a haloalkane, and combinations thereof.

3. The method as defined in claim 2 wherein any of:
   the alcohol is selected from the group consisting of methanol, ethanol, propanol, butanol, and combinations thereof;
   the aldehyde is selected from the group consisting of formaldehyde, acetaldehyde, and combinations thereof;
   the acid is selected from the group consisting of formic acid, acetic acid, and combinations thereof;
   the ketone is selected from the group consisting of acetone, butanone, and methyl ethyl ketone;
   the ether is selected from the group consisting of diethyl ether, methyl ethyl ether, and combinations thereof;
   the furan is selected from the group consisting of tetrahydrofuran and dihydrofuran; or
   the haloalkane is selected from the group consisting of chloroform and dichloromethane.

4. The method as defined in claim 1 wherein the gaseous mixture further includes a carrier gas, and wherein the organic solvent vapor is present in an amount ranging from greater than 0% to about 99.9% by volume based on a total volume of the gaseous mixture.

5. The method as defined in claim 1 wherein:
   the predetermined amount of time associated with the flowing ranges from about 0.5 hours to about 24 hours;
   the predetermined temperature associated with the flowing ranges from about greater than 0° C. to about 300° C.; and
   the predetermined pressure associated with the flowing ranges from about 0 bar to about 10 bar.

6. The method as defined in claim 1 wherein the removing is accomplished by:
   i) passing a non-organic solvent-containing gas through the channel for a first predetermined amount of time, at a first predetermined temperature, and at a first predetermined pressure; or
   ii) placing the channel having the battery material therein into a vacuum drying oven at a second predetermined temperature and at a second predetermined pressure for a second predetermined amount of time; or
   iii) a combination of i) and ii).

7. The method as defined in claim 6 wherein:
   the first predetermined amount of time ranges from about 0.5 hours to about 24 hours;
   the first predetermined temperature ranges from about greater than 0° C. to about 300° C.; and
   the first predetermined pressure ranges from about 0 bar to about 10 bar.

8. The method as defined in claim 6 wherein:
   the second predetermined amount of time ranges from about 0.1 hour to about 24 hours; and
   the second predetermined temperature ranges from about greater than 0° C. to about 250° C.

9. The method as defined in claim 4 wherein the carrier gas is selected from the group consisting of argon gas, helium gas, neon gas, krypton gas, xenon gas, radon gas, nitrogen gas, hydrogen gas, oxygen gas, carbon dioxide gas, methane gas, ethane gas, propane gas, air, and mixtures thereof.

10. The method as defined in claim 9 wherein the selected carrier gas is an inert gas or a mixture of inert gases.

11. The method as defined in claim 6 wherein the non-organic solvent-containing gas is selected from the group consisting of argon gas, helium gas, neon gas, krypton gas, xenon gas, radon gas, nitrogen gas, hydrogen gas, oxygen gas, carbon dioxide gas, methane gas, ethane gas, propane gas, air, and mixtures thereof.

12. The method as defined in claim 11 wherein the selected non-organic solvent-containing gas is an inert gas or a mixture of inert gases.

13. The method as defined in claim 1 wherein, after the removing of the organic solvent vapor having the at least some water molecules bonded thereto, the residual water content in the battery material is reduced to a concentration of less than 600 ppm.

14. The method as defined in claim 1 wherein the battery material is selected from the group consisting of battery material powder, an electrode, a cell core, and combinations thereof.

15. The method as defined in claim 1, further comprising fabricating a battery with the battery material having reduced residual water content, wherein the battery is selected from the group consisting of a lithium ion battery, a lithium sulfur battery, a sodium sulfur battery, and a lithium air battery.

16. The method as defined in claim 15 wherein a drying space with a relative humidity ranging from about 0.1% to about 5% is utilized only during an electrolyte filling process of the fabricating of the battery.

17. A lithium battery fabricated from the battery material having reduced residual water content formed by the method of claim 1.

* * * * *